(12) United States Patent
Hayakawa et al.

(10) Patent No.: US 12,533,157 B2
(45) Date of Patent: Jan. 27, 2026

(54) TREATMENT METHOD AND DEVICE WITH ULTRASOUND ENDOSCOPE

(71) Applicant: OLYMPUS CORPORATION, Tokyo (JP)

(72) Inventors: Tomotaka Hayakawa, Kawaguchi (JP); Tomofumi Katayama, Kunitachi (JP); Takahiro Suzuki, Hachioji (JP); Atsushi Ujino, Hachioji (JP); Yutaka Yanuma, Tokyo (JP); Ayano Yamatani, Tama (JP)

(73) Assignee: Olympus Corporation, Tokyo (JP)

( * ) Notice: Subject to any disclaimer, the term of this patent is extended or adjusted under 35 U.S.C. 154(b) by 1102 days.

(21) Appl. No.: 17/531,887

(22) Filed: Nov. 22, 2021

(65) Prior Publication Data

US 2022/0160392 A1  May 26, 2022

Related U.S. Application Data

(60) Provisional application No. 63/117,645, filed on Nov. 24, 2020.

(51) Int. Cl.
*A61B 17/34* (2006.01)
*A61B 1/00* (2006.01)
(Continued)

(52) U.S. Cl.
CPC ...... *A61B 17/3415* (2013.01); *A61B 1/00135* (2013.01); *A61B 1/018* (2013.01);
(Continued)

(58) Field of Classification Search
CPC . A61B 17/3415; A61B 1/00135; A61B 1/018; A61B 17/00234; A61B 18/14;
(Continued)

(56) References Cited

U.S. PATENT DOCUMENTS

| | | | |
|---|---|---|---|
| 6,200,313 B1 | 3/2001 | Abe et al. | |
| 6,749,621 B2 * | 6/2004 | Pantages | A61B 17/0057 606/213 |

(Continued)

FOREIGN PATENT DOCUMENTS

CN  106456142 A  2/2017

OTHER PUBLICATIONS

Office Action dated Oct. 25, 2023, issued in corresponding Chinese Patent Application No. 202111399454.7.

*Primary Examiner* — Chelsea E Stinson
*Assistant Examiner* — Hamza A Darb
(74) *Attorney, Agent, or Firm* — Morgan, Lewis & Bockius LLP

(57) ABSTRACT

An access device used with an endoscope includes an access pipe configured to be inserted into a sheath of the endoscope, a piercer disposed on a distal end portion of the access pipe and configured to pierce into a hollow organ through a digestive tract of a patient, and a treatment tool configured to be inserted into the access pipe and to be introduced into the hollow organ by the piercer. The access device is switchable between a first configuration and a second configuration. In the first configuration, a piercing function of the piercer is switched on, so that the piercer pierces the digestive tract and the hollow organ to enter into an interior of the hollow organ, and in the second configuration, the piercing function of the piercer is switched off, the piercer is kept connected to the interior of the hollow organ.

14 Claims, 13 Drawing Sheets

(51) Int. Cl.
    *A61B 1/018*     (2006.01)
    *A61B 17/00*     (2006.01)
    *A61B 18/00*     (2006.01)
    *A61B 18/14*     (2006.01)

(52) U.S. Cl.
    CPC ........ *A61B 17/00234* (2013.01); *A61B 18/14* (2013.01); *A61B 18/1477* (2013.01); *A61B 2017/00296* (2013.01); *A61B 2018/00482* (2013.01); *A61B 2018/00535* (2013.01); *A61B 2018/00595* (2013.01); *A61B 2018/00708* (2013.01)

(58) Field of Classification Search
    CPC ...... A61B 18/1477; A61B 2017/00296; A61B 2018/00482; A61B 2018/00535; A61B 2018/00595; A61B 2018/00708; A61B 8/12; A61B 8/445; A61B 17/1114; A61B 2017/1139; A61B 1/00133; A61B 17/3478; A61B 2018/00601; A61B 2018/00982; A61B 2090/3784; A61B 18/1492; A61B 1/0008; A61B 1/00087; A61B 1/00119; A61B 18/12; A61B 18/1482; A61B 18/1485; A61B 18/1487; A61B 1/313

See application file for complete search history.

(56) References Cited

U.S. PATENT DOCUMENTS

| | | | |
|---|---|---|---|
| 2014/0275788 A1* | 9/2014 | McLawhorn | A61B 1/00087 |
| | | | 600/153 |
| 2016/0008063 A1* | 1/2016 | Wake | A61B 17/3203 |
| | | | 606/49 |
| 2018/0028263 A1* | 2/2018 | Keady | A61B 18/1482 |

* cited by examiner

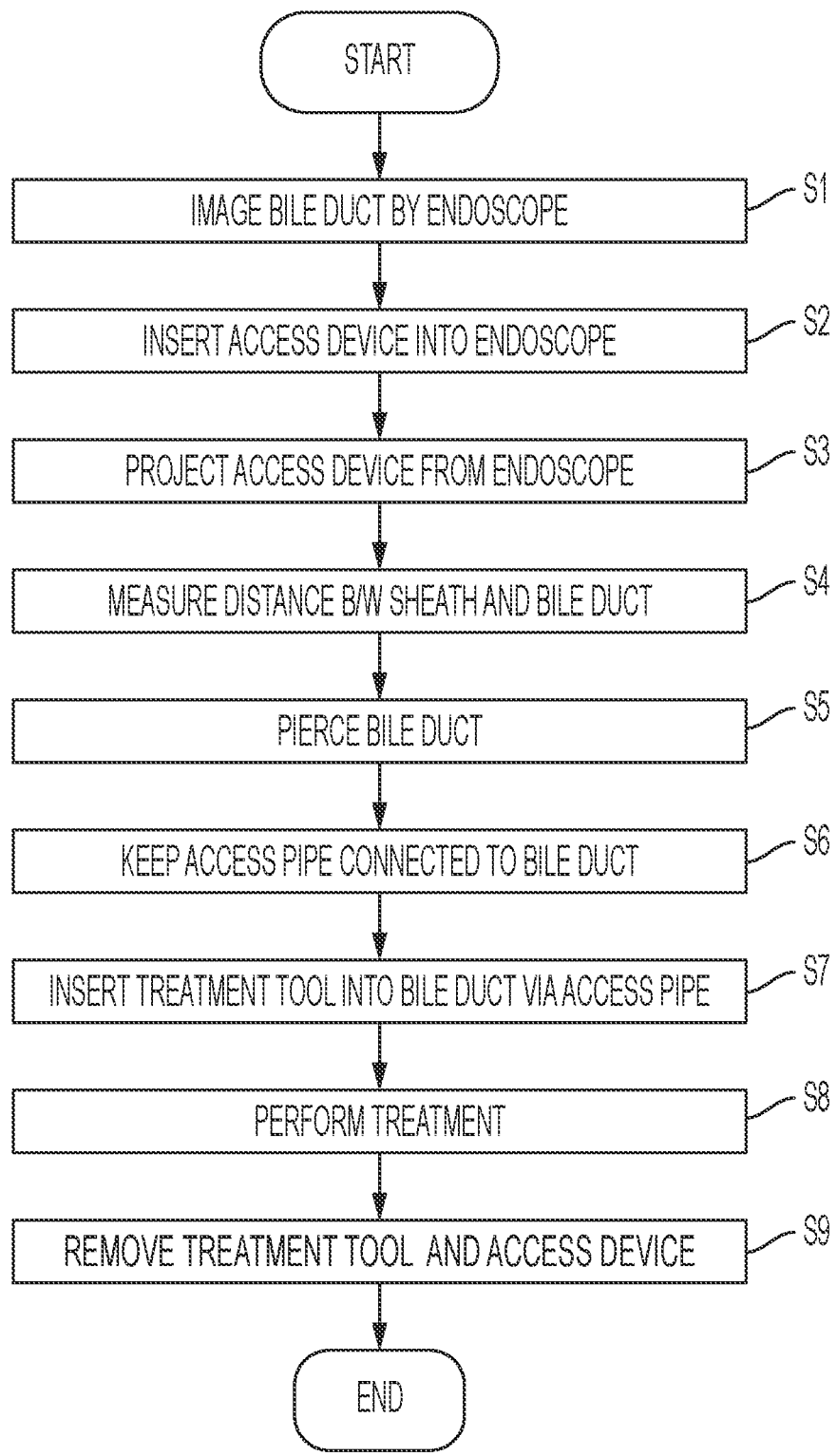

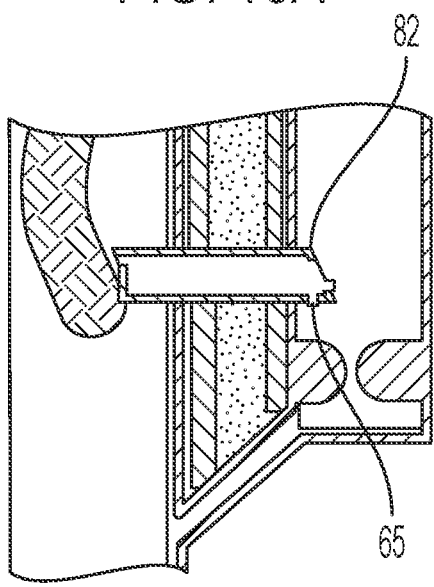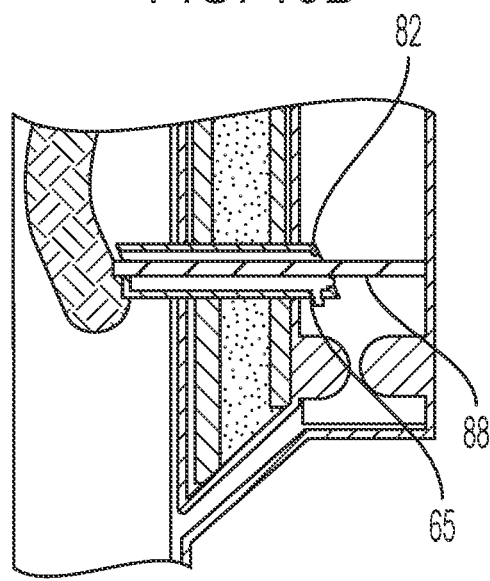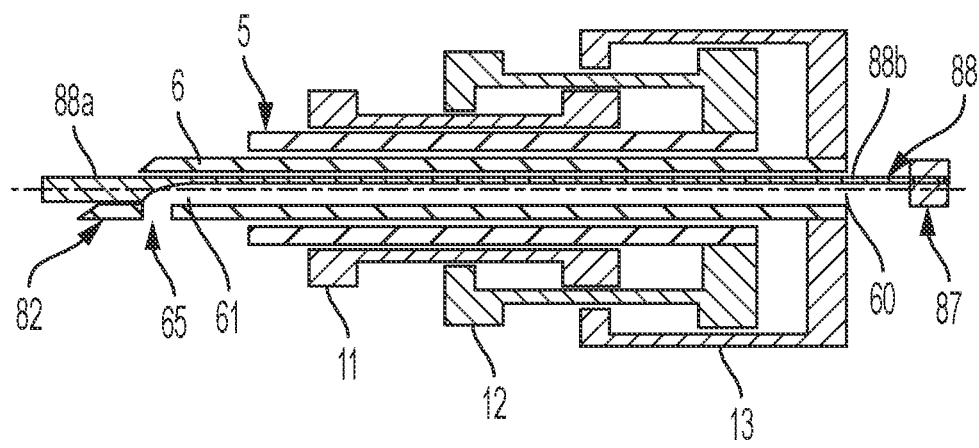

TREATMENT METHOD AND DEVICE WITH ULTRASOUND ENDOSCOPE

RELATED APPLICATION DATA

This application is based on and claims priority under 35 U.S.C. § 119 to U.S. Provisional Application No. 63/117,645, filed Nov. 24, 2020, the entire contents of which are incorporated herein by reference.

FIELD OF THE INVENTION

The present invention relates to an endoscope system, and more particularly, some embodiments relate to an endoscopic access device combined with an ultrasonic endoscope to introduce a treatment tool into the interior of a hollow organ, such as the bile duct or pancreatic duct of a patient, by piercing into the hollow organ.

DESCRIPTION OF THE RELATED ART

Biliary drainage is a procedure that helps drain extra bile. When bile juice blocks the bile duct, it can back up into the liver and cause symptoms like jaundice. To draw accumulated bile from the bile duct into the stomach or duodenum, a biliary drainage with an ultrasound endoscope has been well known, in which a drainage tube introducer is used with the ultrasound endoscope to pierce the bile duct through the stomach or duodenum.

In a typical biliary drainage, a needle is used as the drainage tube introducer, and has a guidewire removably inserted therein. The needle is passed through an inserting channel of the ultrasonic endoscope to puncture a hole through the bile duct from the inner wall of the stomach or duodenum. Thereafter, with the distal end of the guidewire left in the bile duct, the needle is drawn out of the patient's body. Then, the hole made by the needle has to be expanded by, for example, a balloon dilator, so that a stent could be set into the hole.

However, in typical biliary drainage, when the balloon dilator is drawn from the expanded hole and before the stent is set into the expanded hole, it is easy for the bile to leak into the abdominal cavity through the expanded hole, which could cause a complicated disease. Accordingly, a more simplified and safer biliary drainage is desired.

SUMMARY OF THE INVENTION

Accordingly, the present disclosure is directed to an access device used with an endoscope and a method of using the access device to introduce a treatment tool into an interior of a hollow organ, such as the bile duct or pancreatic duct of a patient, which substantially obviates one or more of the issues due to limitations and disadvantages of conventionally-known access device and method.

An object of the present disclosure is to provide an access device used with an endoscope for introducing a treatment tool into a hollow organ of a patient, which includes an access pipe configured to be inserted into a sheath of the endoscope, a piercer disposed on a distal end portion of the access pipe and configured to pierce into the hollow organ through a digestive tract of the patient, and a treatment tool configured to be inserted into the access pipe and to be introduced into the hollow organ by the piercer. The access device is switchable between a first configuration and a second configuration. In the first configuration, a piercing function of the piercer is switched on, so that the piercer pierces the digestive tract and the hollow organ to enter into an interior of the hollow organ, and in the second configuration, the piercing function of the piercer is switched off, the piercer is kept connected to the interior of the hollow organ, and serves as a route to introduce the treatment tool into the interior of the hollow organ.

Another object of the present disclosure is to provide a method of introducing a treatment tool into an interior of a hollow organ, which comprises inserting an access device to a vicinity of a digestive tract of a patient, piercing the digestive tract and the hollow organ, by the access device, into the interior of the hollow organ, inserting the treatment tool, through a lumen of the access device, into the interior of the hollow organ, while the access device is keep connected to the interior of the hollow organ, and treating the hollow organ by the treatment tool.

Still another object of the present disclosure is to provide an access device used with an endoscope comprising an access pipe configured to be inserted into a sheath of the endoscope, a piercer disposed on a distal end portion of the access pipe, and a treatment tool configured to be inserted into the access pipe. The piercer includes an energy device configured to apply energy and a stylet that is disposed inside the access pipe and electrically connected to the piercer.

Still another object of the present disclosure is to provide an access device used with an endoscope comprising an access pipe configured to be inserted into a sheath of the endoscope, a piercer disposed on a distal end portion of the access pipe, and a treatment tool configured to be inserted into the access pipe. The piercer includes a piercing tube that is disposed at the distal end of the access pipe, and a stylet that is disposed inside the access pipe.

Additional features and advantages will be set forth in the description that follows, and in part will be apparent from the description, or may be learned by practice of the invention. The objectives and other advantages of the disclosed input device will be realized and attained by the structure particularly pointed out in the written description and claims thereof as well as the appended drawings.

BRIEF DESCRIPTION OF THE DRAWING

The following detailed description of preferred embodiments can be read in connection with the accompanying drawings in which like numerals designate like elements and in which:

FIG. 6 is a flow chart illustrating exemplary steps of using the endoscopic access device to introduce the treatment tool.

FIG. 10A is a cross-sectional views schematically showing an endoscopic access device according to a fifth exemplary embodiment, and FIG. 10B is a cross-sectional views schematically showing the endoscopic access device using a stylet according to the fifth exemplary embodiment.

FIG. 11A is an enlarged vertical cross-sectional view schematically showing the endoscopic access device of FIG. 10B.

DETAILED DESCRIPTION

In the following description, various embodiments of the technology will be described. For purposes of explanation, specific configurations and details are set forth in order to provide a thorough understanding of the embodiments. However, it will also be apparent to one skilled in the art that the technology disclosed herein may be practiced without the specific details. Furthermore, well-known features may be omitted or simplified in order not to obscure the embodiment being described.

Figure 1:
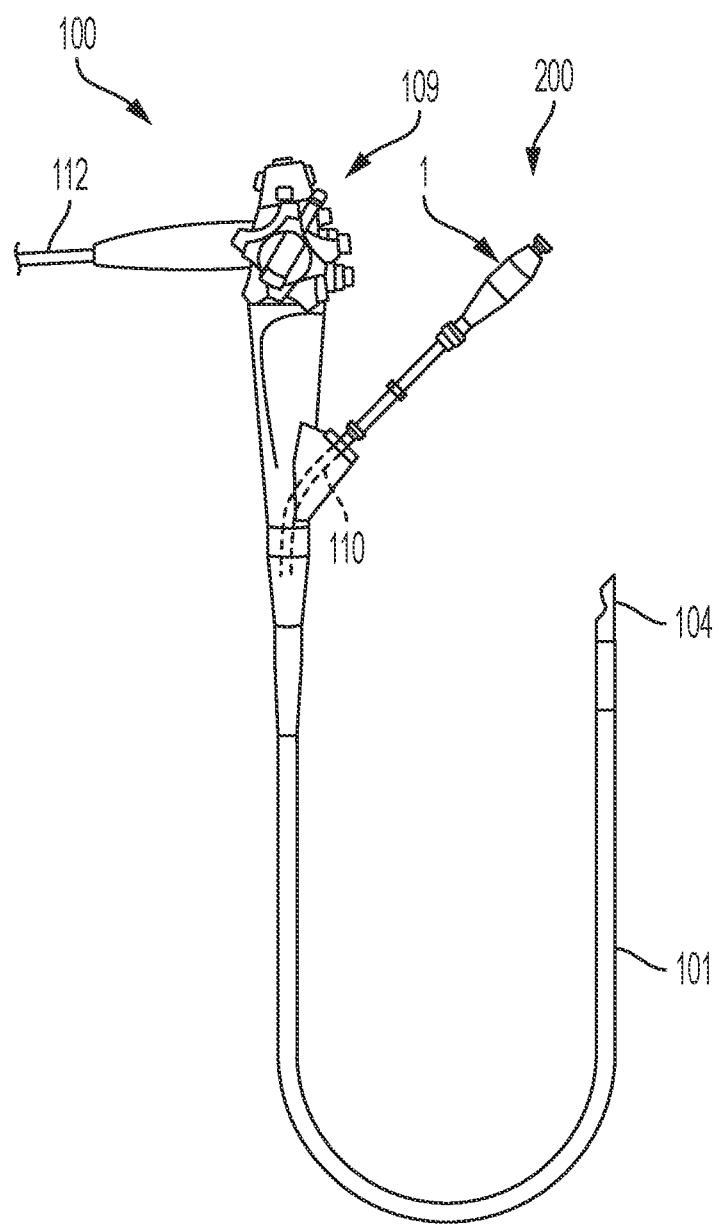
FIG. 1 is a view illustrating an example of an endoscopic access device combined with an ultrasound endoscope according to an exemplary embodiment.

As illustrated in FIG. 1, an endoscopic access device 1 according to this exemplary embodiment is for use in an endoscopic system 200 combined with an ultrasonic endoscope 100.

The ultrasonic endoscope 100 can be utilized to perform diagnosis or treatment on an internal body part of a patient, such as the digestive organs or respiratory organs. The ultrasonic endoscope 100 includes an insertion portion 101 to be inserted into the body from a distal end thereof, an operation mechanism 109 attached to a proximal end of the insertion portion 101, a universal cord 112 connected at an end thereof to a side portion of the operation mechanism 109, and an ultrasonic observation portion (not shown) connected to an opposite of the universal cord 112.

The insertion portion 101 includes, at the distal end thereof, an optical imaging system configured to perform optical observation, and an ultrasonic probe 104 configured to perform ultrasonic observation.

The optical imaging system may include an imaging optical system with a field of vision directed diagonally forward, and an image sensor, such as a charge coupled device (CCD) or a complementary metal-oxide semiconductor (CMOS), configured to detect an image of an object as entered through the imaging optical system.

The ultrasonic probe 104 includes an ultrasonic transducer that emits and receives ultrasonic waves. More specifically, the ultrasonic transducer emits ultrasonic waves toward an observation target; the ultrasonic waves strike the observation target and are reflected; and the reflected waves are received by the ultrasonic transducer. The ultrasonic probe 104 is configured to output signals to the ultrasonic observation portion based on the reflected waves received by the ultrasonic transducer. The ultrasonic probe 104 in this embodiment is used to acquire an ultrasonic wave image of a tissue as an access target, and also to acquire an ultrasonic wave image of an access pipe 6 (in FIG. 3) in the course of procedures of piercing hollow organs for introducing a treatment tool into an interior of a target organ. The usage of the endoscopic access device 1 and the related procedures will be described hereinafter.

The insertion portion 101 includes a channel 110 that extends in a longitudinal direction through the insertion portion 101. The channel 110 opens, at one end thereof, in a vicinity of the distal end of the insertion portion 101, and at an opposite end thereof, opens in a side wall of the ultrasonic endoscope 100, the side wall being located in a vicinity of the operation mechanism 109 and providing an access point for endoscopic access device 1.

Figure 2A:
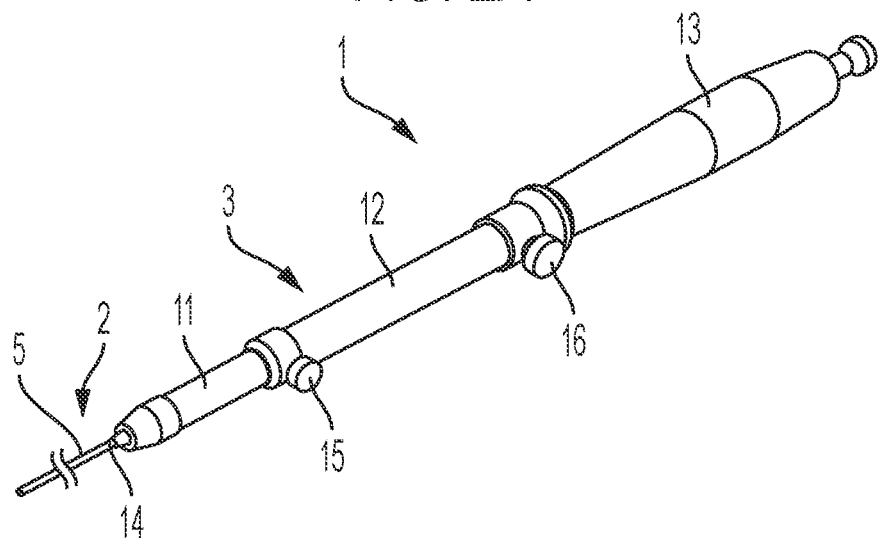
FIGS. 2A-2D are perspective views illustrating the endoscopic access device of FIG. 1.

FIGS. 2A-2D are perspective views illustrating the endoscopic access device 1 of FIG. 1. As illustrated in FIG. 2A, the endoscopic access device 1 according to this embodiment includes an insertion body 2 to be inserted into the body of a patient, and a manipulation portion 3 for operating the insertion body 2.

The insertion body 2 is an elongated member, which can be inserted, as shown in FIG. 1, into the channel 110 from an opening thereof in the vicinity of the operation mechanism 109 of the ultrasonic endoscope 100 and is allowed to protrude from an opening in a vicinity of the ultrasonic probe 104 at the distal end of insertion portion 101.

The manipulation portion 3 includes an attachment adapter 11 formed of a cylindrical member for fixing the endoscopic access device on the ultrasonic endoscope 100, a sheath slider 12 attached to a proximal end side of the attachment adapter 11, and an access device slider 13 disposed on a proximal end side of the sheath slider 12. The attachment adapter 11 and sheath slider 12 may be configured, for example, of acrylonitrile butadiene styrene (ABS) resin or the like, and have an internal bore 14 through which the access pipe 6 (in FIG. 3A) and sheath 5 can be inserted along a longitudinal direction.

The attachment adapter 11 is inserted, on the proximal end side thereof, in the sheath slider 12 formed in a tubular shape. The sheath slider 12 and the attachment adapter 11 are slidable relative to each other in the longitudinal direction, with their relative rotation about a longitudinal axis being suppressed, by engagement of one or more grooves or the like and one or more ridges or the like (not illustrated) formed in and on their outer and inner circumferential surfaces, respectively. The sheath slider 12 and the access device slider 13 are also configured similarly.

The sheath 5 disposed inside the sheath slider 12 is attached to the sheath slider 12. On a distal end of the sheath slider 12, a fixing thumbscrew 15 may be disposed. The fixing thumbscrew 15 influences movement of the sheath slider 12 in a longitudinal direction relative to the attachment adapter 11, for example, limiting or preventing movement when tightened, and allowing movement when loosened.

Figure 2B:
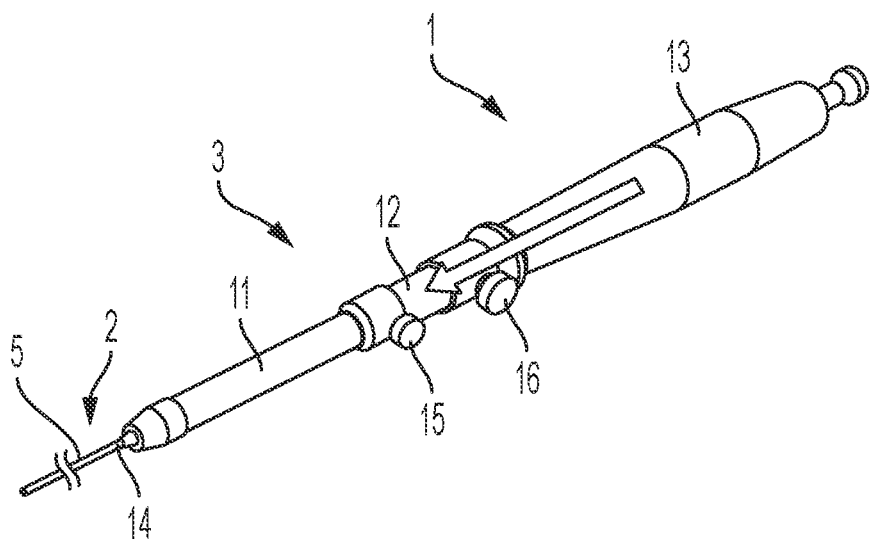

The access pipe 6 (in FIGS. 3A-3C) is attached at a proximal end portion thereof to the access device slider 13. More specifically, the proximal end portion of the access pipe 6 protrudes from a proximal end of the sheath 5, extends into the access device slider 13, and is attached to the access device slider 13 at the proximal end portion of the access device slider 13. The access device slider 13 is connected to the sheath slider 12 so that the access device slider 13 is movable in a longitudinal direction relative to the sheath slider 12. As a consequence, the endoscopic access device 1 is configured so that the access pipe 6 is caused to advance relative to the sheath 5 when the access device slider 13 is moved toward a distal end side of the endoscopic access device 1 relative to the sheath slider 12 as illustrated in FIG. 2B.

On a distal end of the access device slider 13, a fixing thumbscrew 16 may be disposed. The fixing thumbscrew 16 influences movement of the access device slider 13 relative to the sheath slider 12, for example, limiting or preventing movement when tightened, and allowing movement when loosened.

Figure 2C:
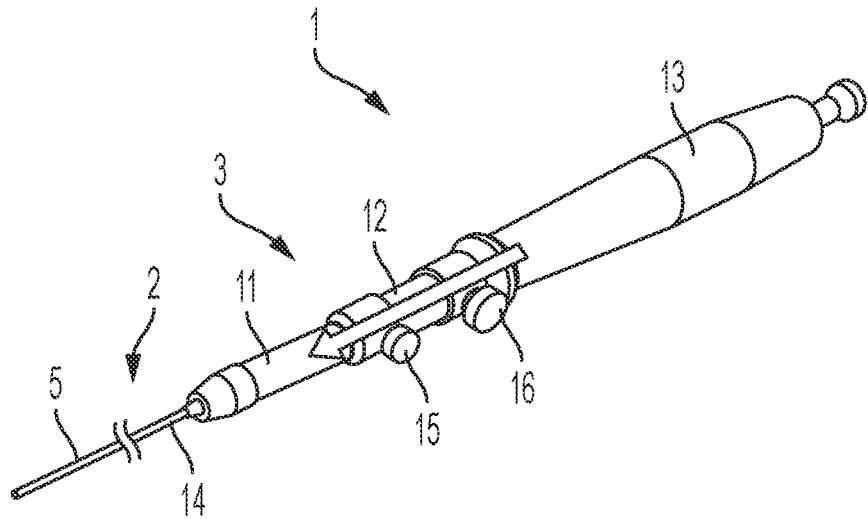

The access pipe 6 and the sheath 5 are configured so that, when the sheath slider 12 with the access device slider 13 fixed thereon by the fixing thumbscrew 16 is moved toward the distal end side of the endoscopic access device 1 (relative to the attachment adapter 11), the sheath 5 is caused to advance together with the access pipe 6 as illustrated in FIG. 2C.

Figure 2D:
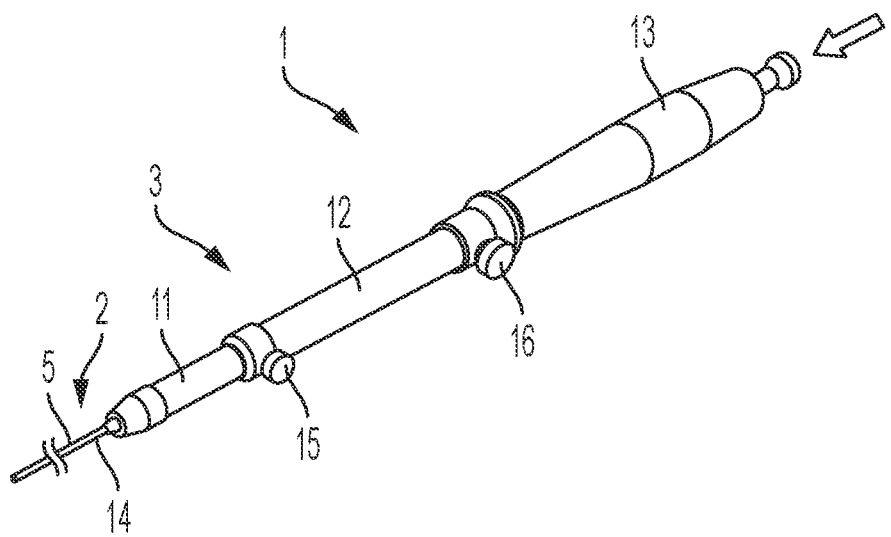
Figure 3A:
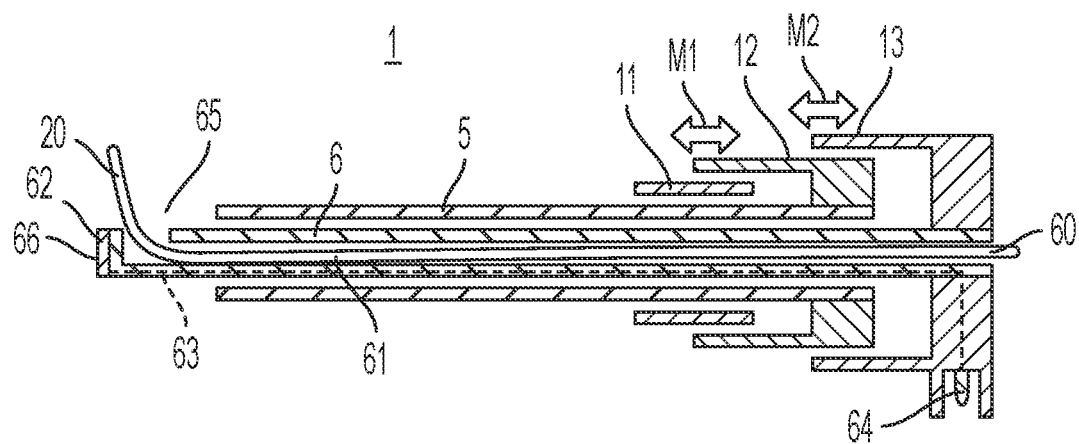
FIGS. 3A-3C are enlarged vertical cross-sectional views schematically showing the endoscopic access device of FIG. 2A according to a first exemplary embodiment.

The access pipe 6 and the access device slider 13 are configured so that the access pipe 6 has a proximal end opening 60 (in FIGS. 3A-3C) through a proximal end wall of the access device slider 13. As illustrated in FIG. 2D and FIG. 3A, a treatment tool 20, which is configured to cauterize cancer or remove stones in this exemplary embodiment, can be inserted into a lumen 61 (in FIGS. 3A-3C) of the access pipe 6 via the opening 60 in the proximal end wall of the access device slider 13.

FIG. 3A is an enlarged vertical cross-sectional view schematically showing the endoscopic access device of FIG. 2A. In FIG. 3A, the attachment adapter 11 is used to fix the endoscopic access device 1 on the ultrasonic endoscope 100, the sheath slider 12 is attached to a proximal end side of the attachment adapter 11, and the access device slider 13 is disposed on a proximal end side of the sheath slider 12. The sheath slider 12 and the access devices slider 13 may be advanced and retracted along a longitudinal direction indicated by the arrows (labeled M1 and M2). In other words, the sheath slider 12 and the access devices slider 13 are slidable relative to each other in the longitudinal direction.

The sheath 5 disposed inside the sheath slider 12 is attached to the proximal end portion of the sheath slider 12. The access pipe 6 is attached at the proximal end portion of the access device slider 13. As illustrated in FIG. 3A, the proximal end portion of the access pipe 6 protrudes from the proximal end portion of the sheath 5, extends into the access device slider 13, and is attached to the access device slider 13 at the proximal end portion of the access device slider 13. By such a configuration, when the access device slider 13 is moved toward the distal end side of the endoscopic access device 1 (relative to the sheath slider 12), the access pipe 6 is advanced relative to the sheath 5. When the sheath slider 12 is moved toward the distal end side of the endoscopic access device 1 (relative to the attachment adapter 11), the sheath 5 is advanced together with the access pipe 6. When the sheath slider 12 is moved, the access device slider 13 is moved together.

The access pipe 6 has the proximal end opening 60, through which the treatment tool 20 is inserted into the lumen 61 of the access pipe 6 and advanced to a distal end portion of the access pipe 6. Then, the treatment tool 20 can be guided into a target organ via an opening 65 that is formed at a side surface of the distal end portion of the access pipe 6.

Also, the access device 1 includes a piercer 62 that is disposed at the distal end portion of the access pipe 6. In this exemplary embodiment, the piercer 62 includes an electrode. The access device 1 may also include a plug 64 that is formed at the proximal end portion of the access pipe 6 and an electric wire 63 that is connected to the electrode of the piercer 62 and the plug 64.

The electric wire 63 may be a flexible stranded wire formed by twisting together electrically conductive metal small-gage wires. Or, the electric wire 63 may be a single wire of an electrically conductive metal. The electric wire 63 may be embedded in a wall of the access pipe 6, which is formed by an inner surface and an outer surface of the access pipe 6. Thus, the piercer 62 may be turned on by switching the plug 64 to the "ON" position, and turned off by switching the plug 64 to the "OFF" position.

In this exemplary embodiment, the access pipe 6 includes the built-in electric wire 63. The access pipe 6 may be made of any suitable biocompatible material, such as, but not limited to, polymeric polymers and materials, including fillers such as metals (in the case that the access pipe 6 is made of a metal, the electric wire 63 is coated with an insulator), carbon fibers, glass fibers or ceramics, and combinations thereof. Useful, but non-limiting, polymeric materials include polyethylene, polypropylene, polyvinyl chloride, polytetrafluoroethylene, fluorinated ethylene propylene copolymer, polyvinyl acetate, polystyrene, polyethylene terephthalate), naphthalene dicarboxylate derivatives, such as polyethylene naphthalate, polybutylene naphthalate, polytrimethylene naphthalate and trimethylenediol naphthalate, polyurethane, polyurea, silicone rubbers, polyamides, polycarbonates, polyaldehydes, natural rubbers, polyester copolymers, styrene-butadiene copolymers, polyethers, fully or partially halogenated polyethers, polyamide/polyether polyesters, and copolymers and combinations thereof, and ABS (acrylonitrile butadiene styrene copolymer), PEEK (Poly Ether Ether Ketone), etc.

In this exemplary embodiment, the piercer 62 includes an electrode disposed at the distal end of the access pipe 6. The piercer 62 is exposed to the outside and connected to the electric wire 63 by brazing or soldering, for example. A high-frequency electric current may be passed through the electric wire 63 to turn on the piercer 62 by switching the plug 64 on. The sheath 5 may be made of an insulating material or a metal. In the case that the sheath 5 is made of a metal (coil type for example), the access pipe 6 other than the piercer 62 may be made of resin to prevent electric leakage. In this exemplary embodiment, since the sheath 5 is formed from an electrically insulating material, there is no leakage of electric current to the outer surface of the sheath 5. Also, the sheath slide 12 and the access slide 13 are also provided with an electrically insulating cover. Therefore, there is no leakage of electric current to the outer surface of the access device 1.

The piercer 62 may be formed in the shape of cylinder with a flat end surface 66. The piercer 62 may also have a hemispherical end or any other appropriate protection shape, which may serve to prevent the piercer 62 from getting unwanted damage to the tissue when the piercer 62 is inserted into a hollow organ.

The opening 65 is designed for the treatment tool 20 inserted into the lumen 61 of the access pipe 6 to be projected out of the access pipe 6, so that the treatment tool 20 can be delivered to a target location. Also, the access pipe 6 is configured to be rotatable so that the opening 65 can be adjusted, if needed, to face a specific direction for guiding the delivery of the treatment tool 20 to a specific location.

Figure 3B:
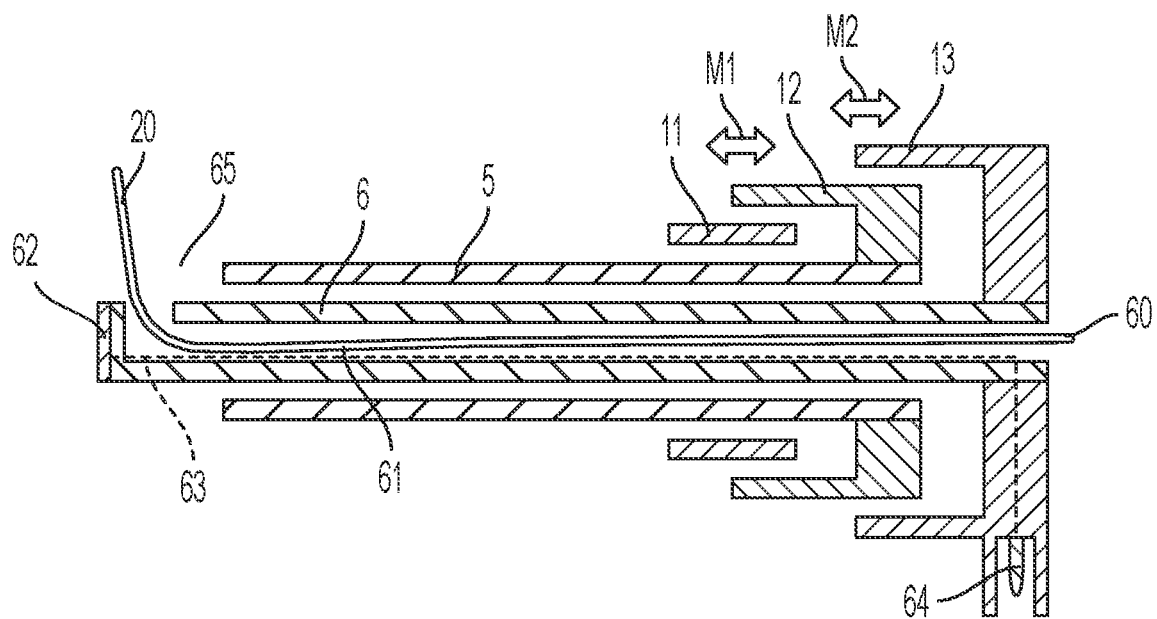
Figure 3C:
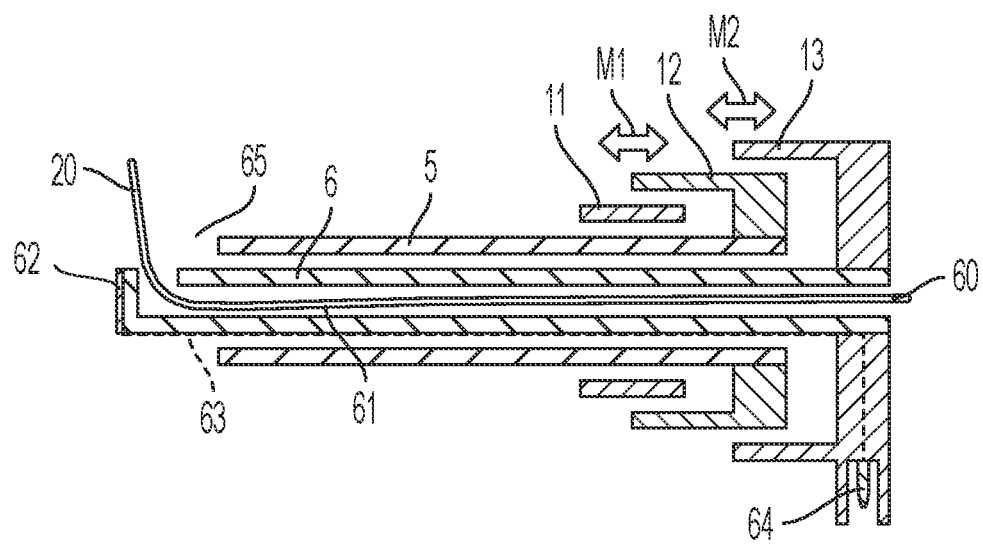

FIGS. 3B and 3C are also enlarged vertical cross-sectional views schematically showing the endoscopic access device of FIG. 2A. Different from FIG. 3A, FIG. 3B illustrates an exemplary embodiment in which the electric wire 63 is attached to an inner wall of the access pipe 6 and extended in the longitudinal direction of the access pipe 6; and FIG. 3C illustrates an exemplary embodiment in which the electric wire 63 is attached to an outer wall of the access pipe 6 and extended in the longitudinal direction of the access pipe 6. The electric wire 63 shown in either FIG. 3B or FIG. 3C may be coated by an insulator.

Figure 4A:
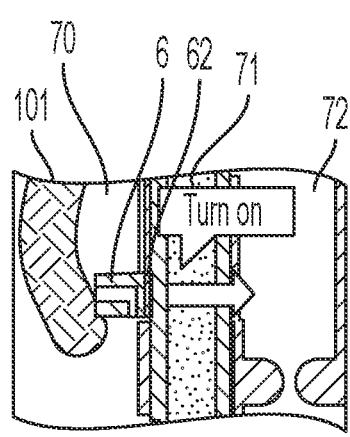
FIG. 4A and FIG. 4B are cross-sectional views schematically showing an endoscopic access device piercing a target organ according to the first exemplary embodiment.
Figure 4B:
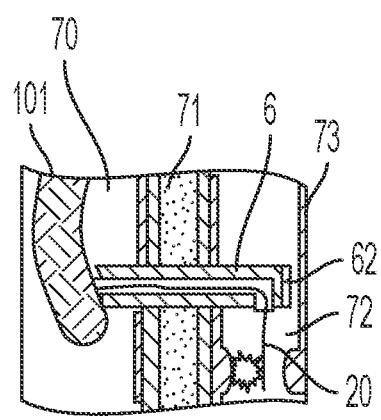

FIG. 4A and FIG. 4B are cross-sectional views schematically showing the endoscopic access device 1 in different configurations of piercing a target organ according to an exemplary embodiment.

The access device 1 is operatively configured to be switchable between a first status/configuration and a second status/configuration. As shown in FIG. 4A, the endoscopic access device 1 is in a first status/configuration. The first configuration corresponds to a piercing function of the piercer 62 being in an operatively active status in which the piercer is configured to pierce a digestive tract and a hollow organ to enter into an interior of the hollow organ, Specifically, in this exemplary embodiment, the access pipe 6 is projected out of the sheath 5 so that the piercer 62 is advanced to a position at which the piercer 62 is set to pierce a target tissue on an inner wall of the duodenum or stomach 70 and aims at a target area (location) on the wall of luminal organs such as the bile duct (or pancreatic duct) 72. Then, by switching on the plug 64, a high-frequency current is passed to the electrode of the piercer 62 through the electric wire 63, and the piercer 62 is turned on to activate its piercing function. At this moment, the piercer 62 can start the piercing procedure, in which the piercer 62 enters into the interior of the bile duct 72 by piercing through the duodenum or stomach 70 and the abdominal cavity 71.

Once the piercing procedure is completed, the access device 1 is switched into a second status/configuration. The second configuration corresponds to the piercing function of the piercer 62 being in an operatively deactivated status in which the piercer is configured to be connected to the interior of the hollow organ, and is configured to provide a passage to introduce the treatment tool 20 into the interior of the hollow organ.

Specifically, in this exemplary embodiment, as shown in FIG. 4B, the piercer 62 is turned off by switching off the plug 64, and no high-frequency current is passed through the electric wire 63. The access pipe 6 including the piercer 62 is connected to the interior of the bile duct 72 and kept as it is, so that the lumen 61 of the access pipe 6 is used as a passage for introducing the treatment tool 20 into the bile duct 72.

A description will hereinafter be made about operation of the endoscopic access device 1 of this embodiment configured as described hereinbefore.

In order to insert the treatment tool 20 into the bile duct 72 by using the endoscopic access device 1 combined with the ultrasound endoscope 100 according to an exemplary embodiment, an operator inserts the insertion portion 101 of the ultrasonic endoscope 100 into the body of the patient, and introduces the ultrasonic probe 104 disposed at the distal end portion of the insertion portion 101 to a target area of the duodenum or stomach 70. The ultrasonic probe 104 includes the optical imaging system that takes endoscopic ultrasound (EUS) images of the duodenum or stomach 70 and the bile duct 72. While observing the images with the optical imaging system, the operator determines a piercing site (target tissues) at the inner wall of the duodenum or stomach 70 as well as a piercing site at the wall of the bile duct 72, and confirms that there is no blood vessel on a piercing route/passage, e.g., the route/passage formed by the piercing sites located on the duodenum or stomach 70, the abdominal cavity 71 and the bile duct 72.

Next, the operator inserts the insertion body 2 of the endoscopic access device 1 from the distal end side thereof into the channel 110 through the opening in the vicinity of the operation mechanism 109 of the ultrasonic endoscope 100, and fixes the attachment adapter 11 in the vicinity of the operation mechanism 109. As a consequence, the endoscopic access device 1 is attached to the ultrasonic endoscope 100 so that the endoscopic access device 1 does not rotate relative to the operation mechanism 109.

The fixing thumbscrew 15 is loosened. By moving the sheath slider 12 in its longitudinal direction relative to the attachment adapter 11 while observing the sheath 5 and the inside of the body by the optical imaging system and the ultrasonic probe 104, the operator next adjusts the length of a protrusion of the sheath 5 from the distal end of the insertion portion 101 of the ultrasonic endoscope 100 to an appropriate extent so that the sheath 5 protrudes to a location where the sheath 5 can be identified by the optical imaging system. Also, the protrusion length of the sheath 5 may be adjusted so that the protrusion of the sheath 5 hits the wall of the duodenum or stomach 70. After the protrusion length of sheath 5 is adjusted, the fixing thumbscrew 15 is tightened.

Next, a distance (distance A for example) from the sheath 5 to the bile duct 72 is measured under the EUS images. The fixing thumbscrew 16 is loosened and moved only by the distance A so as not to puncture more than the distance to the bile duct 72. Then the fixing thumbscrew 16 is tightened.

Next, the fixing thumbscrew 16 is loosened to move the access device slider 13 in its longitudinal direction relative to the sheath slider 12 so that the piercer 62 disposed at the distal end of the access pipe 6 is caused to advance to a location where the piercer 62 comes out of the distal end of the sheath 5 and the access device slider 13 is slowly moved to the fixing thumbscrew 16.

Figure 5A:
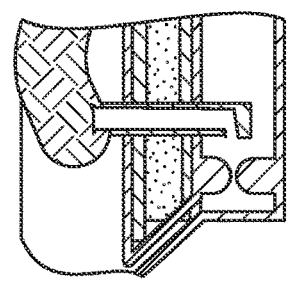
FIGS. 5A-5D are cross-sectional views schematically showing a method of using the endoscopic access device to introduce a treatment tool according to an exemplary embodiment.

Next, the plug 64 is switched ON so that a high-frequency current is passed through the electric wire 63 to turn on the electrode of the piercer 62, thereby heating a front end surface 66 of the piercer 62. Then, the front end surface 66 of the piercer 62 touches the organic tissues on the respective piercing sites at the duodenum or stomach 70 and the bile duct 72. As the organic tissues of the piercing sites are cauterized and coagulated, the piercing procedure can be smoothly performed with minimal to no bleeding. While watching the ultrasonic wave images, the operator manipulates the piercer 62 to pierce into the bile duct 72 from the piercing site at the duodenum or stomach 70, aiming at the piercing site at the bile duct 72 as illustrated in FIG. 5A.

The piercing procedure also includes a process of confirming if there is bile refluxed into the access pipe 6 via the opening 65. By detecting the bile juice passing through the access pipe 6, it can surely confirm that the opening 65 is present in the bile duct 72.

After the piercing procedure, a procedure may be performed, such as cholangiography. In this procedure, the operator may inject a contrast medium into the bile duct 72 through the access pipe 6 so as to take the images of the bile duct by x-rays.

Figure 5B:
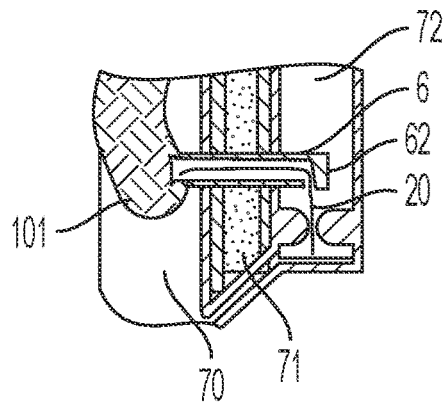

As shown in FIG. 5B, when the piercer 62 pierces into the bile duct 72 by a predetermined distance inside the bile duct 72, the piercer 62 is turned OFF and switched into the second status/configuration. The diameter of the bile duct 72 varies, but is about 1 mm-20 mm. The opening 64 should be near the center of the bile duct 72 to prevent the access pipe 6 from coming off the bile duct 72 and the piercer 62 from making strong contact with the wall of the bile duct 72. Thus, depending on the diameter of the bile duct 72, the opening 65 may be maintained at a position by 0.5 mm-10 mm away from the bile duct wall. At this moment, the distal end portion of the access pipe 6 including the piercer 62 is positioned at both the duodenum or stomach 70 and the bile duct 72, and the opening 65 is kept inside the bile duct 72. By this configuration, the lumen 61 of the access pipe 6 can serve as a route or channel for introducing the treatment tool 20 into the bile duct 72. Since the front surface 66 of the piercer 62 is flat or may be formed with any suitable protection shape, the piercer 62 can minimize or prevent unwanted damage to the tissues on the inner wall of bile duct 72 even the front surface 66 of the piercer 62 contacts the bile duct 72. Also, a gap may exist between the front end surface 66 of the piercer 62 and the inner wall of the bile duct 72, thereby ensuring no contact between the piercer 62 and the bile duct 72 in the second configuration of the access device 1.

Next, the operator inserts the treatment tool 20 from the proximal end opening 60 of the access pipe 6 located at the proximal end wall of the access device slider 13. The treatment tool 20 is caused to pass through the lumen 61 of the access pipe 6 and to protrude from the distal end opening 65 formed at a side surface of the access pipe 6, thereby extending into the bile duct 72. As shown in FIG. 4A, reference numeral 73 denotes a place inside the bile duct 72 where bile duct stenosis (due to the bile duct cancer or pancreatic cancer) or stones are clogged and that is a target area for the treatment.

The access pipe 6 is configured to be rotatable in 360 degrees. Thus, if the treatment tool 20 is extended in a wrong direction, the operator can retreat the treatment tool 20 back into the access pipe 6, and then rotate the access pipe 6 to adjust a facing angle of the opening 65 until the opening 65 faces a direction that allows for guiding the treatment tool 20 to the target area 73. Then, the treatment tool 20 can be advanced toward the target area, which, in this exemplary embodiment, is an area where the extra bile is accumulated.

Figure 5C:
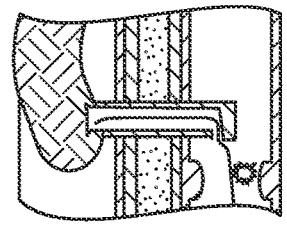
Figure 5D:
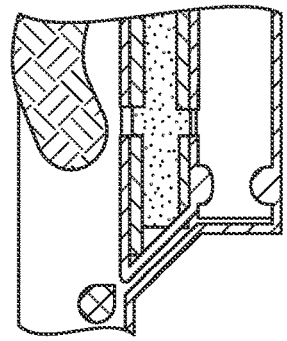

As shown in FIG. 5C, after the treatment tool 20 is advanced into the target area 73 of the bile duct 72, the treatment is performed, in which the accumulated bile in the bile duct 72 is drawn out to the duodenum or stomach 70. For example, as shown in FIG. 5D, if the cancer has invaded the surface of the bile duct wall and causes the bile duct stenosis, a procedure is performed where a device is inserted and uses heat or chemical methods to cauterize the stenosis, or the stenosis is dilated with a balloon dilation device. By such a procedure, the bile juice is drained from the duodenal papilla 74. If the stone is clogged, a pusher may be inserted to push the stone toward the duodenum papilla 74 or a device that can break the stone is inserted to shed stone.

After the accumulated bile juice is discharged from the duodenum or stomach 70, the access pipe 6 including the piercer 62 and the treatment tool 20 are pulled back to the duodenum or stomach 70, respectively, or at the same time. Then the access device 1 is removed from the insertion channel 110.

In this embodiment, the endoscopic access device 1 attached to the ultrasonic endoscope 100 is exemplified. The invention is not limited to this configuration. Instead of such an ultrasonic endoscope, the endoscopic access device 1 may be attached to any other desired endoscopes.

FIG. 6 is a flowchart showing an exemplary method for inserting the endoscopic access device 1 into the bile duct 72 to indwell the treatment tool 20 to perform the intended procedure according to this exemplary embodiment.

As shown in FIG. 6, the above described method of inserting the access device 1 to perform the intended treatment may include at least the following steps.

At Step S1, the bile duct is imaged by the ultrasound endoscope 100. Specifically, the insertion portion 101 of the ultrasound endoscope 100 is inserted into the duodenum or stomach 70, and the optical imaging system disposed at the distal end portion of the insertion portion 101 is used to take images of the bile duct, as well as the duodenum or stomach 70, to determine the respective piercing sites at the bile duct 72 and the duodenum or stomach 70. The respective piercing sits are used to define a piercing route. Step 1 also includes using the ultrasound probe 104 to confirm that no blood vessel on the piercing route so as to avoid the blooding.

At Step S2, the endoscopic access device 1 is inserted into the ultrasound endoscope 100. Specifically, the access device 1 is inserted into the insertion channel 110 from the opening at the side wall being located in the vicinity of the operation mechanism 109, and the access pipe 6 including the piercer 62 of the access device 1 is advanced to the distal end of the sheath 5 disposed inside the insertion channel 110.

At Step S3, the access pipe 6 including the piercer 62 is projected from the distal end of sheath 5. Specifically, the access pipe 6 of the access device 1 is projected out of the sheath 5 so that the piercer 62 of the access pipe 6 is advanced to a position abutting the confirmed piercing site at the inner wall of the duodenum or stomach 70.

At Step S4, a distance between the distal end of the sheath 5 or the piercer 62 of the access pipe 6 and the bile duct 72 is measured. Based on the distance, the operator knows how far to push the access pipe 6 including the piercer 62 into the bile duct 72 without damaging the bile duct 72.

At Step S5, the piercing procedure is performed. Specifically, the piercer 62 is turned on by passing the high-frequency current through the electric wire 63 to the electrode of the piercer 62. Thus, the access device 1 is in the first status/configuration, in which the piercer 62 activates its piercing function to pierce the respective piercing sites at the duodenum or stomach 70 and the bile duct 72. Once the piercer 62 enters into the bile duct 72 by a predetermined distance, the piercer 62 is turned off. The access device 1 is switched into the second status/configuration.

At Step S6, after the piercer 62 is inserted into the bile duct 72, the access pipe 6 including the piercer 62 is kept inside the bile duct 72, so that the lumen 61 of the access pipe 6 is used as a route or channel for introducing the treatment tool 20 into the bile duct 72.

At Step S7, the treatment tool 20 is inserted into the bile duct 72 via the access pipe 6. Specifically, the treatment tool 20 is inserted into the lumen 61 of the access pipe 6 and projected out of the access pipe 6 via the opening 65 formed at the side surface of the distal end portion of the access pipe 6. The access pipe 6 may be rotated to adjust a facing angle of the opening 65 if the opening 65 faces a wrong direction, thereby ensuring the treatment tool 20 to be guided in a correct direction to the target area inside the bile duct 72.

At Step S8, the treatment tool 20 is guided to the target area of the bile duct 72, which, in this exemplary embodiment, is the area where the extra bile is accumulated inside the bile duct 72. Then, the treatment is performed to draw the extra bile out of the bile duct 72 into the duodenum or stomach 70.

At Step S9, after the treatment is completed, the access pipe 6 and the treatment tool 20 are pulled back to the duodenum or stomach 70. Then the access device 1 is removed from the insertion channel 110

The endoscopic access device 1 of the present invention is not limited to the examples of the above-described embodiments. In the following description, the same components as those already described will be assigned the same reference numerals and overlapping description will be omitted.

Second Embodiment

Figure 7A:
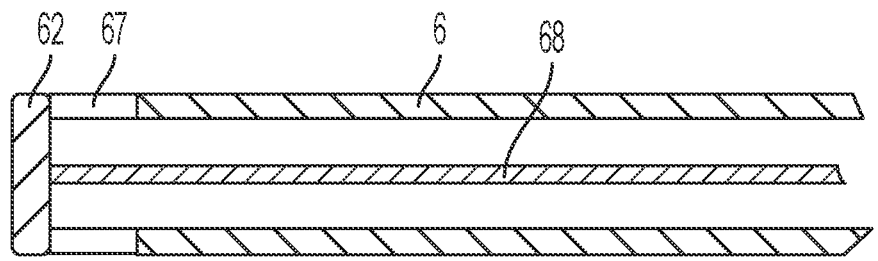
FIGS. 7A-7C are cross-sectional views schematically showing an endoscopic access device according to a second exemplary embodiment.
Figure 7B:
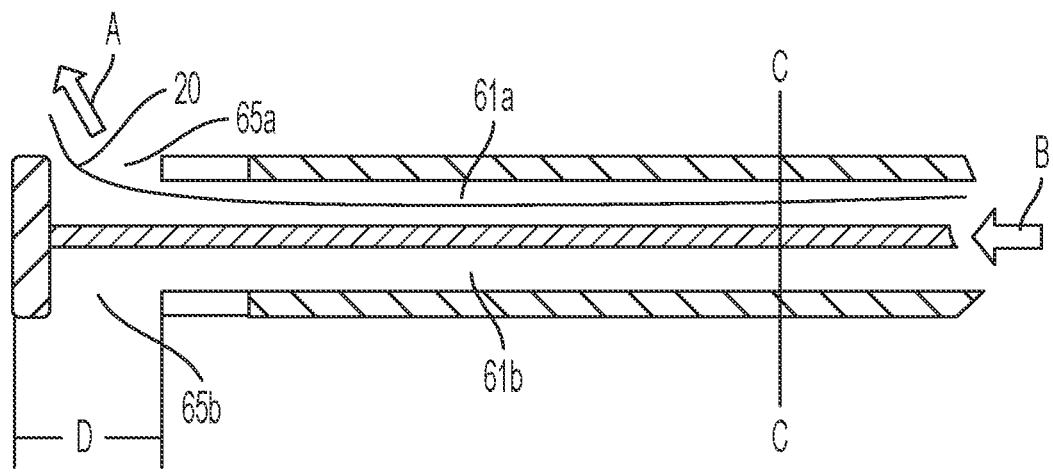
Figure 7C:
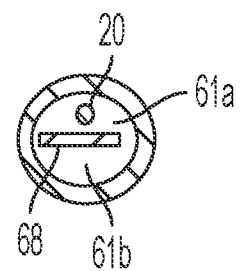

FIG. 7A is an enlarged vertical cross-sectional view schematically showing an endoscopic access device in a first configuration according to a second exemplary embodiment, FIG. 7B is an enlarged vertical cross-sectional view schematically showing the endoscopic access device in the second configuration, and FIG. 7C is a cross-sectional view of line C-C of FIG. 7B.

The access device 1 shown in FIGS. 7A-7C includes a stylet 68 that is disposed inside the access pipe 6 and connected to the piercer 62. The stylet 68 may be configured to have a plate shape (see FIG. 7C), and includes a distal end connected to the center of the piercer 62, thereby dividing the access pipe 6 into a first sub-lumen portion 61a and a second sub-lumen portion 61b. The stylet 68 includes a proximal end, and is able to move relative to the access device slider 13, which allows the stylet 68 to be pushed forward from the access pipe 6(not shown).

Also, the stylet 68 includes a built-in electric wire that is connected to the piercer 62. In this exemplary embodiment, the piercer 62 is an energy device that is configured to irradiate energy to the target tissues. As shown in FIG. 7A, the access device 1 is in the first status/configuration in which the piercer 62 is retracted to the access pipe 6. Also, in the first status/configuration, the stylet 68 is configured to activate the piercer 62. Specifically, the piercer 62 is turned on by the stylet 68 through which the high-frequency current is passed, and thus is able to pierce the target tissues on the piercing sites of the duodenum or stomach 70 and the bile duct (or pancreatic duct) 72.

Once the piercing procedure is completed, the access device 1 is switched into the second status/configuration. The stylet 68 is also configured to deactivate the piercer 62. As shown in FIG. 7B, in the second configuration, the piercer 62 is turned off by the stylet 68 since no high-frequency current is passed therethrough. Further, the piercer 62 is advanced away from the access pipe 6 by pushing the stylet 68 in a direction shown by arrow "B" to a predetermined distance D. The predetermined distance D is measured, in the second status and configuration, between the piercer 62 and the bile duct wall of the bile duct 72 under the EUS images, and on the condition that the piercer 62 does not come into strong contact with the bile duct wall. The distance D is between the advanced piercer 62 and the access pipe 6, and is shorter than the inner diameter of the bile duct 72.

The stylet 68 may be made of any suitable biocompatible material with the built-in electric wire 63, such as, but not limited to, polymeric polymers and materials, including fillers such as metals, carbon fibers, glass fibers or ceramics, and combinations thereof. Useful, but non-limiting, polymeric materials include polyethylene, polypropylene, polyvinyl chloride, polytetrafluoroethylene, fluorinated ethylene propylene copolymer, polyvinyl acetate, polystyrene, polyethylene terephthalate), naphthalene dicarboxylate derivatives, such as polyethylene naphthalate, polybutylene naphthalate, polytrimethylene naphthalate and trimethylenediol naphthalate, polyurethane, polyurea, silicone rubbers, polyamides, polycarbonates, polyaldehydes, natural rubbers, polyester copolymers, styrene-butadiene copolymers, polyethers, fully or partially halogenated polyethers, polyamidc/polyether polyesters, and copolymers and combinations thereof.

The access device 1 shown in FIGS. 7A-7C may also include an insulator 67 that is arranged between the piercer 62 and the access pipe 6. The insulator 67 may have the same shape as the access pipe 6 or any suitable shape to prevent any electric leakage to the outer surface of the sheath 5 and the outer surface of the access pipe 6.

The insulator 67 may be made of any suitable biocompatible material including, but not limited to, polymeric polymers and materials, including fillers such as metals, carbon fibers, glass fibers or ceramics, and combinations thereof. Useful, but non-limiting, polymeric materials include polyethylene, polypropylene, polyvinyl chloride, polytetrafluoroethylene, fluorinated ethylene propylene copolymer, polyvinyl acetate, polystyrene, polyethylene terephthalate), naphthalene dicarboxylate derivatives, such as polyethylene naphthalate, polybutylene naphthalate, polytrimethylene naphthalate and trimethylenediol naphthalate, polyurethane, polyurea, silicone rubbers, polyamides, polycarbonates, polyaldehydes, natural rubbers, polyester copolymers, styrene-butadiene copolymers, polyethers, fully or partially halogenated polyethers, polyamidc/polyether polyesters, and copolymers and combinations thereof.

The treatment tool 20 may be inserted from the proximal end opening 60 into one of the first sub-lumen portion 61a and the second sub-lumen portion 61b. As shown in FIG. 7B, the treatment tool 20 is inserted into the first sub-lumen portion 61a and is projected from the access pipe 6 via the opening 65a in a direction shown by the arrow "A" toward a target area for the treatment. Depending on the treatment situation, one same or different treatment tool may also be inserted from the proximal end opening 60 into the unused sub-lumen portion, i.e., the second sub-lumen portion 61b. Alternatively, the treatment tool 20 may be switched between the first sub-lumen portion 61a and the second sub-lumen portion 61b, depending on the treatment purpose.

Third Embodiment

Figure 8A:
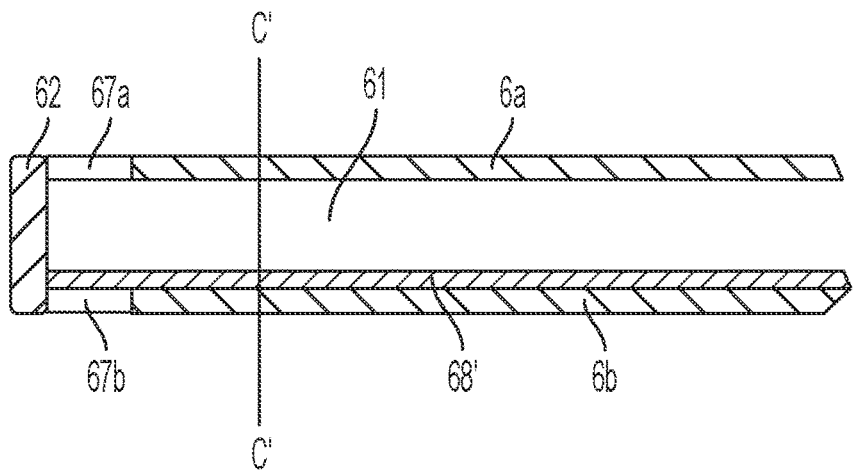
FIGS. 8A-8C are cross-sectional views schematically showing an endoscopic access device according to a third exemplary embodiment.
Figure 8B:
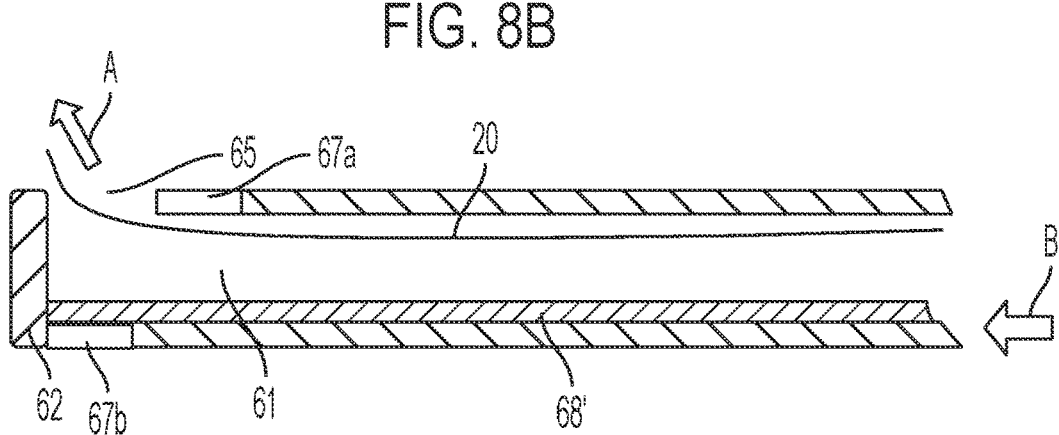
Figure 8C:
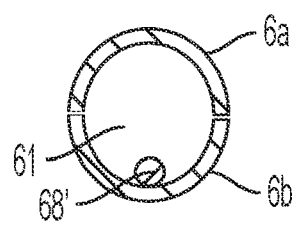

FIG. 8A is an enlarged vertical cross-sectional view schematically showing the endoscopic access device 1 in the first configuration according to a third exemplary embodiment, FIG. 8B is an enlarged vertical cross-sectional view schematically showing the endoscopic access device 1 in the second configuration, and FIG. 8C is a cross-sectional view of line C'-C' of FIG. 8A.

The access device 1 shown in FIGS. 8A-8C includes the access pipe 6 that is divided into an upper pipe portion 6a and a lower pipe portion 6b, which are slidable relative to each other. Also, the access device 1 includes a stylet 68' that is disposed along the inner wall of the access pipe 6 and connected to the piercer 62. In this exemplary embodiment, the stylet 68' is disposed on a surface of the inner wall of the lower pipe portion 6b. The stylet 68' may be shaped like a cable having its distal end connected to the piercer 62, and its proximal end connected to the proximal end portion of the access device slider 13 (not shown). Alternatively, the stylet 68' includes a portion that is in contact with the lower pipe portion 6b. The portion of the stylet 68' is coated with an insulation coating material, and part of the coating material may be peeled off only at a place where it is connected to the piercer 62. With this structural configuration, the lower pipe portion 6b may be made of a metal material, so that the access pipe 6 can have a strong puncture performance.

Also, the stylet 68' includes a built-in electric wire (not shown) that is connected to the piercer 62. Thus, the access device 1 is switched into the first status/configuration when the piercer 62 is turned on by passing the high-frequency current through the stylet 68'. In the first status/configuration, the access device 1 is configured to pierce the organic tissues on the piercing sites of the duodenum or stomach 70 and the bile duct (or pancreatic duct) 72, with the piercer 62 is retracted to the access pipe 6 and the openings 65 (in FIG. 8B) is closed as shown in FIG. 8A. The access device 1 is switched into the second status/configuration, in which the piercer 62 is turned off at the moment when the piercer 62 is advanced away from the upper pipe portion 6a by pushing the lower pipe portion 6b in a direction shown by arrow "B" to the predetermined distance D. The opening 65 is thus opened facing a direction as shown by arrow "A" between the piercer 62 and the upper pipe portion 6a of the access pipe 6.

Alternatively, the access device 1 may be switched into the second status/configuration by pushing the upper pipe portion 6a according to a treatment situation. In this situation, the opening 65 is opened facing a direction opposite to the direction shown by the arrow "A" in FIG. 8B.

As described above, the predetermined distance D is calculated as a value that is smaller than the inner diameter of the bile duct 72, so that a gap exists between the piercer 62 and the inner wall of the bile duct 72, thereby ensuring no contact between the piercer 62 and the bile duct 72 in the second configuration of the access device 1. Also, as the front surface 66 of the piercer 62 is flat or may be formed with any suitable protection shape, the piercer 62 can minimize or prevent unwanted damage to the tissues on the inner wall of bile duct 72 even the piercer 62 contacts the bile duct 72.

As described above, the stylet 68' may be made of any suitable biocompatible material, which is the same as the stylet 68 of the second embodiment.

Referring FIGS. 8A-8C, the access device 1 includes an upper insulator 67a that is arranged between the piercer 62 and the upper pipe portion 6a, and a lower insulator 67b that is arranged between the piercer 62 and the lower pipe portion 6b. The insulators 67a and 67b may be formed corresponding to the respective shapes of the access pipe portions 6a and 6b or any suitable shapes to prevent any electric leakage to the outer surface of the sheath 5 and the outer surface of the access pipe 6.

The insulators 67a and 67b may be made of the same material as the insulator 67 of the second embodiment.

The treatment tool 20 may be inserted from the proximal end opening 60 into the sub-lumen 61. As shown in FIG. 8B, the treatment tool 20 is inserted into the lumen 61 and is projected from the access pipe 6 via the opening 65 in a direction shown by the arrow "A" toward a target area for the treatment. Also, the access pipe 6 is configured to be rotatable so as to adjust a facing direction of the opening 65 so as to introduce the treatment tool 20 to advance in a correct direction.

Alternatively, the stylet 68' can be disposed on a surface of the inner wall of the upper pipe portion 6a, with the above description be generally applicable to such an embodiment with suitable adaptation to account for the stylet 68' being disposed on a surface of the inner wall of the upper pipe portion 6a rather than of the lower pipe portion 6b.

Fourth Embodiment

Figure 9A:
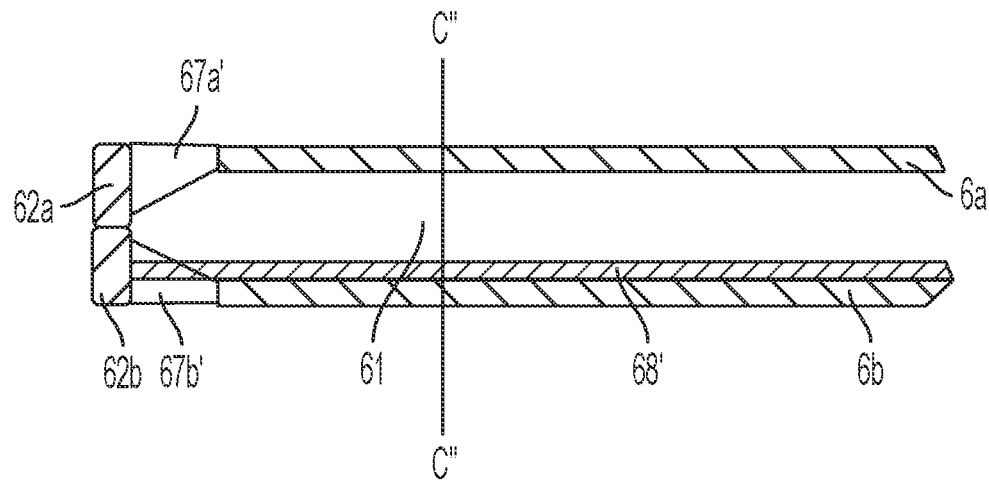
FIGS. 9A-9C are cross-sectional views schematically showing an endoscopic access device according to a fourth exemplary embodiment.
Figure 9B:
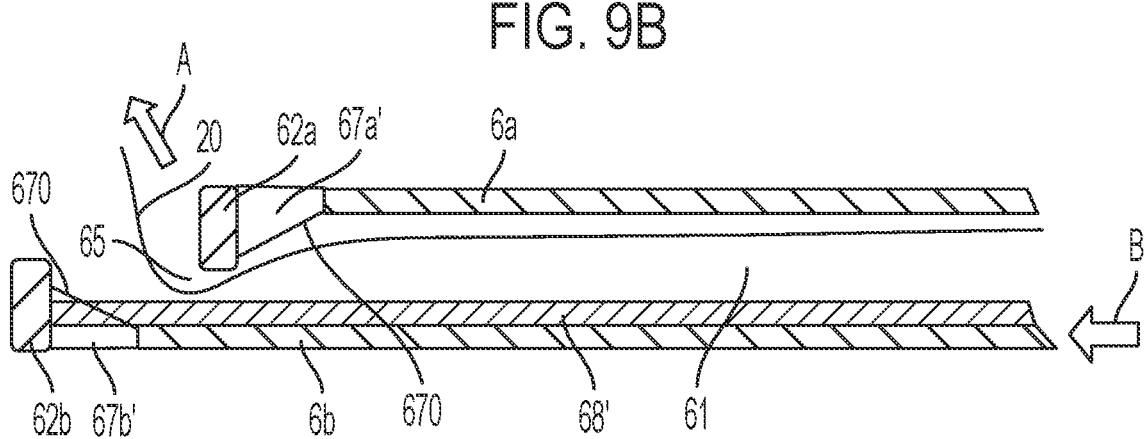
Figure 9C:
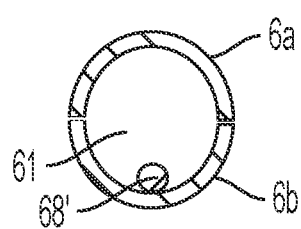

FIG. 9A is an enlarged vertical cross-sectional view schematically showing an endoscopic access device in the first configuration according to a fourth exemplary embodiment, FIG. 9B is an enlarged vertical cross-sectional view schematically showing the endoscopic access device in the second configuration, and FIG. 9C is a cross-sectional view of line C"-C" of FIG. 9A.

The access device 1 shown in FIGS. 9A-9C includes the piercer 62 that is divided into an upper portion 62a and a lower portion 62b. The upper portion 62a and the lower portion 62b are detachably integrated together. Thus, the access device 1 is switched into the first status/configuration when the piercer 62 is turned on by passing the high-frequency current through the stylet 68'. In the first status/configuration, the access device 1 is able to pierce the organic tissues on the piercing sites of the duodenum or stomach 70 and the bile duct (or pancreatic duct) 72, with the upper portion 62a and the lower portion 62b are retracted to the access pipe 6 to be integrated together as shown in FIG. 9A. Also, the opening 65 (in FIG. 9B) is closed in the first status/configuration.

The access device 1 is switched into the second status/configuration when the piercer 62 is turned off. In the second configuration, the lower portion 62b of the piercer 62 is advanced away from the upper pipe portion 6a of the access pipe 6 by pushing the lower pipe portion 6b in a direction shown by arrow "B" to the predetermined distance D. The opening 65 is thus opened between the upper portion 62a of the piercer 62 and the lower pipe portion 6b of the access pipe 6.

Alternatively, depending to the treatment situation, the access device 1 may be switched into the second status/configuration by pushing the upper pipe portion 6a. In this situation, the upper portion 62a of the piercer 62 is advanced away from the lower pipe portion 6b of the access pipe 6 by pushing the upper pipe portion 6a in the direction shown by the arrow "B" to the predetermined distance D. The opening 65 is thus opened facing an opposite direction to the arrow "A" between the lower portion 62b of the piercer 62 and the upper pipe portion 6a. With such a configuration, when the direction of the arrow "A" in FIG. 9B is opposite to a target area, the treatment tool 20 can be easily guided to the target area by pushing the upper pipe portion 6a.

As described above, the predetermined distance D is calculated as a value that is smaller than the inner diameter of the bile duct 72, so that a gap exists between the piercer 62 and the inner wall of the bile duct 72, thereby ensuring no contact between the piercer 62 and the bile duct 72 in the second configuration of the access device 1. Also, as the front surface 66 of the piercer 62 is flat or may be formed with any suitable protection shape, the piercer 62 can minimize or prevent unwanted damages to the tissues on the inner wall of bile duct 72 even the piercer 62 contacts the bile duct 72.

Also, as shown in FIGS. 9A-9C, the access device 1 includes an insulator 67a' and an insulator 67b'. The insulator 67a' is arranged between the upper portion 62a of the piercer 62 and the upper pipe portion 6a of the access pipe 6. The insulator 67b' is arranged between the lower portion 62b of the piercer 62 and the lower pipe portion 6b of the access pipe 6. The insulator 67a' may be formed with its distal end surface contacting and covering an inside surface of the upper portion 62a of the piercer 62, and its proximal end surface contacting and covering the distal end surface of the upper pipe portion 6a. The insulator 67b' may be formed with its distal end surface contacting and covering an inside surface of the upper portion 62b of the piercer 62, and its proximal end surface contacting and covering the distal end surface of the upper pipe portion 6b.

As shown in FIG. 9B, the insulators 67a' and 67b' each have an inclined surface 670. The inclined surface 670 extends from the access pipe 6 toward the opening 65 in an obtusely inclined direction (relative to the inner surface of the upper pipe portion 6a), which can serve to guide the treatment tool 20 to be advanced to the opening 65.

The insulators 67a' and 67b' may be made of the same material as the insulator 67 of the second embodiment.

The treatment tool 20 may be inserted from the proximal end opening 60 into the sub-lumen 61. As shown in FIG. 9B, the treatment tool 20 is inserted into the lumen 61 and is projected out of the access pipe 6 via the opening 65 in a direction shown by the arrow "A" toward a target area for the treatment. In this exemplary embodiment, the inclined surface 670 serves to facilitate the advancing movement of the treatment tool 20 by guiding the treatment tool 20 toward the opening 65 when the treatment tool 20 reaches the distal end of the access pipe 6.

Also, the access pipe 6 is configured to be rotatable, so as to control the facing direction of the opening 65 and introduce the treatment tool 20 to advance in a correct direction.

Alternatively, the features and operations associated with the upper portion 62a and the lower portion 62b can be switched, with the above description be generally applicable to such an embodiment with suitable adaptation to account for the stylet 68' being disposed on a surface of the inner wall of the upper portion 62a rather than of the lower portion 62b.

Fifth Embodiment

FIG. 10A is a cross-sectional views schematically showing an endoscopic access device according to a fifth exemplary embodiment, and FIG. 10B is a cross-sectional views schematically showing the endoscopic access device 1 using a stylet according to the fifth exemplary embodiment.

The endoscopic access device of the fifth exemplary embodiment includes a piercer 82 disposed at the distal end of the access pipe 6. The piercer 82 is a needle in this exemplary embodiment, and has an opening communicating with the lumen 61 of the access pipe 6. In the first status/configuration, the piercer 82 puncture the wall between the duodenum or stomach 70 and the abdominal cavity and the wall between the abdominal cavity and the bile duct (or pancreatic duct) 72.

As shown in FIG. 10B, the access device includes a stylet 88 that is disposed inside the access pipe 5. Once the piercer 82 punctures into the bile duct 72, the stylet 88 is pushed to protrude out of the piercer 82 until the stylet 88 contacts the inner wall of the bile duct 72.

In this exemplary embodiment, the stylet 88 is configured to have a flat front surface that comes to contact with the inner wall of the bile duct 72 without hurting the tissues of the bile duct 72. The front surface of the stylet 88 may have any suitable protection shape that can minimize or prevent the stylet 88 from causing unwanted damage to the tissues of the bile duct 72.

The stylet 88 may be made of the same material as the stylets 68 and 68' in the other embodiments.

Figure 11B:
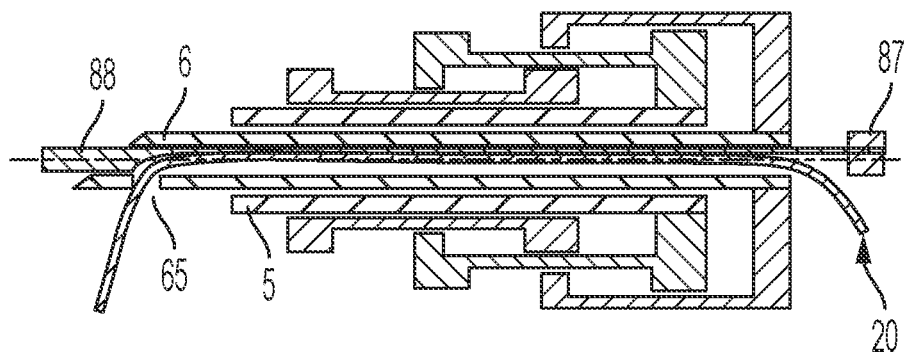
FIG. 11B is an enlarged vertical cross-sectional view schematically showing the endoscopic access device of FIG. 11A in which a treatment tool is introduced.

FIG. 11A is an enlarged vertical cross-sectional view schematically showing the endoscopic access device of FIG. 10B, and FIG. 11B is an enlarged vertical cross-sectional view schematically showing the endoscopic access device of FIG. 11A in which a treatment tool is introduced.

As shown in FIG. 11A, the stylet 88 may be controlled by a stylet operating unit 87. The stylet 88 includes a distal end portion 88a that is configured to be protruded out of the piercer 82, and an elongated body portion 88b that is connected between the distal end portion 88a and the stylet operating unit 87. The distal end portion 88a has a diameter that is slightly smaller than the inner diameter of the access pipe 6. The elongated body portion 88b is designed to have a size that is able to share the lumen 61 with the treatment tool 20 so as not to affect the movement of the treatment tool 20 inside the lumen 61. In the first status/configuration, the distal end portion 88a is disposed inside the access pipe 6 without projecting to the outside of the access pipe 6, and the opening 65 is also closed by the distal end portion 88a. When the access device is in the second status/configuration, as shown in FIG. 11A, the distal end portion 88a of the stylet 88 is pushed to protrude from the piercer 82 by the stylet operating unit 87. As the distal end portion 88a is projected to the outside of the piercer 82, the opening 65 is opened.

The elongated body portion 88b may be made of a highly rigid material so that the stylet 88 can be easily pushed.

As shown in FIG. 11B, when the opening 65 is opened, the treatment tool 20 is inserted into the access pipe 6 and introduced into the bile duct 72 via the opening 65. With such a configuration, the distance between the bile duct wall and the piercer 82 can be kept constant.

Sixth Embodiment

Figure 12A:
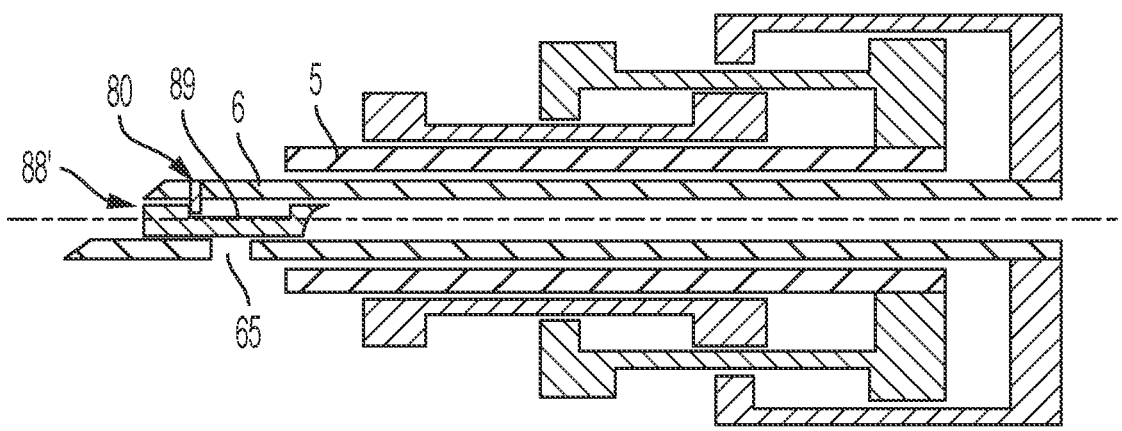
FIG. 12A is an enlarged vertical cross-sectional view schematically showing the endoscopic access device according to a sixth exemplary embodiment.
Figure 12B:
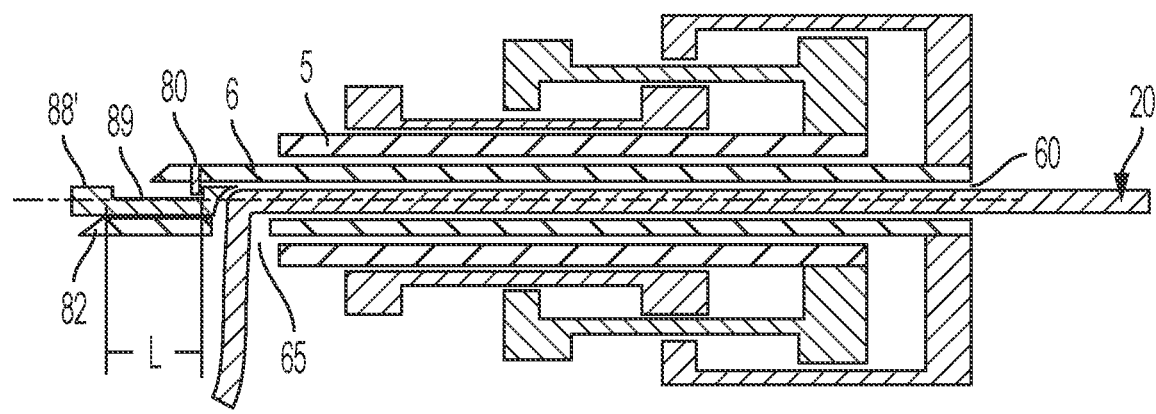
FIG. 12B is an enlarged vertical cross-sectional view schematically showing the endoscopic access device of FIG. 12A in which a treatment tool is introduced.

FIG. 12A is an enlarged vertical cross-sectional view schematically showing the endoscopic access device according to a sixth exemplary embodiment, and FIG. 12B is an enlarged vertical cross-sectional view schematically showing the endoscopic access device of FIG. 12A in which a treatment tool is introduced.

The access device of the sixth embodiment includes a stopper 80 that controls the movement of a stylet 88' along the access pipe 6. As shown in FIG. 12A, the stopper 80 has one end portion mounted in the inner wall of the access pipe 6, and the other end portion received by or engaged with a groove (or recess) 89 of the stylet 88'. The groove 89 is formed on a center portion of the stylet 88' and extends in the longitudinal direction of the access pipe 6 toward its distal end side and its proximal side.

The groove 89 has a length L in the longitudinal direction defined by its distal end side and its proximal side. The stopper 80 is configured to stop the advancing movement of the stylet 88' by contacting the proximal side of the groove 89 and to stop the retracting movement of the stylet 88' by contacting the distal end side of the groove 89. The length L of the groove 89 defines the maximum distance by which the stylet 88' can be advanced away from the piercer 82.

When the access device 1 is in the first status/configuration, the stylet 88' is disposed inside the distal end portion of the access pipe 6 and blocks the opening 65. The stopper 80 may be in contact with the distal end side of the groove 89.

As shown in FIG. 12B, when the access device 1 is in the second status/configuration, the stylet 88' is pushed to protrude from the piercer 82 by the treatment tool 20, and the advancement of the stylet 88' is stopped when the stopper 80 contacts the proximal side of the groove 89. Also the opening 65 is completely opened by the advancement of the stylet 88'. Thus, the treatment tool 20 inserted into the lumen 61 of the access pipe 6 can be guided into the bile duct (or pancreatic duct) 72 via the opening 65.

The stylet 88' may be formed by the same material as the stylet 88 in the fifth embodiment.

In this exemplary embodiment, the stopper 80 is shaped as a cuboid. However, stopper 80 may be any shape that is suitable to associate with the groove 89 to control the movement of the stylet 88'. Also, the stopper 80 may be formed of any suitable biocompatible material, such as, but not limited to, polymeric polymers and materials, including fillers such as metals, carbon fibers, glass fibers or ceramics, and combinations thereof. Useful, but non-limiting, polymeric materials include polyethylene, polypropylene, polyvinyl chloride, polytetrafluoroethylene, fluorinated ethylene propylene copolymer, polyvinyl acetate, polystyrene, polyethylene terephthalate), naphthalene dicarboxylate derivatives, such as polyethylene naphthalate, polybutylene naphthalate, polytrimethylene naphthalate and trimethylenediol naphthalate, polyurethane, polyurea, silicone rubbers, polyamides, polycarbonates, polyaldehydes, natural rubbers, polyester copolymers, styrene-butadiene copolymers, polyethers, fully or partially halogenated polyethers, polyamide/polyether polyesters, and copolymers and combinations thereof.

While various embodiments of the disclosed technology have been described above, it should be understood that they have been presented by way of example only, and not of limitation. Likewise, the various diagrams may depict an example schematic or other configuration for the disclosed technology, which is done to aid in understanding the features and functionality that can be included in the disclosed technology. The disclosed technology is not restricted to the illustrated example schematic or configurations, but the desired features can be implemented using a variety of alternative illustrations and configurations. Indeed, it will be apparent to one of skill in the art how alternative functional, logical or physical locations and configurations can be implemented to implement the desired features of the technology disclosed herein.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary schematics, block diagrams, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular configuration.

What is claimed is:

1. An access device used with an endoscope, comprising:
    an access pipe configured to be inserted into a sheath of the endoscope;
    a piercer disposed on a distal end portion of the access pipe and configured to pierce into a hollow organ of a patient through a digestive tract of the patient;
    a treatment tool configured to be inserted into the access pipe and to be introduced into the hollow organ by the piercer; and
    a stylet that is disposed inside the access pipe and electrically connected to the piercer
    wherein the access device is switchable between a first configuration and a second configuration,
    wherein the piercer includes an energy device configured to be turned on in the first configuration,
    wherein, in the first configuration, the stylet is configured to activate the energy device to pierce the piercer into the hollow organ,
    wherein, in the second configuration, the stylet is configured to deactivate the energy device, and is configured to advance the piercer away from the access pipe to create an opening between the piercer and the access pipe of sufficient dimension to introduce the treatment tool into the hollow organ via the opening, and
    wherein, in the first configuration, the opening between the piercer and the access pipe is closed.

2. The access device according to claim 1, wherein the piercer includes an electrode connected to an electric wire that is disposed along the access pipe, and
    wherein, in the first configuration, the access device is configured to pass a high-frequency current through the electric wire, and
    wherein in the second configuration, the access device is configured to not pass the high-frequency current through the electric wire.

3. The access device according to claim 1, wherein the opening is near a side surface of the distal end portion of the access pipe.

4. The access device according to claim 1, wherein the opening is partitioned into a first opening portion and a second opening portion by the stylet, and
    wherein the first opening portion faces a direction different than a direction of the second opening portion.

5. The access device according claim 1,
wherein the access pipe is divided into a first part and a second part, which are slidable relative to each other, and the stylet is attached to one of the first part and the second part,
wherein, in the first configuration, the stylet is located inside the access pipe, and
wherein, in the second configuration, the stylet is configured to be advanced away from the other of the first part and the second part to form the opening.

6. The access device according to claim 5, further comprising a first insulator disposed between a first section of the piercer and a first part of the access pipe, and a second insulator disposed between a second section of the piercer and a second part of the access pipe,
wherein the first insulator includes a first inclined surface extending from the first part of the access pipe toward a center of the access pipe, and the second insulator includes a second inclined surface extending from the second part of the access pipe toward the center of the access pipe, and
wherein, in the second configuration, at least one of the first inclined surface and the second inclined surface is configured to guide the treatment tool into the hollow organ.

7. The access device according to claim 5, wherein the piercer includes a first section and a second section, and
wherein, in the second configuration, the one of the first section and the second section of the piercer and the stylet are operatively configured to be advanced away from the other of the first section and the second section of the piercer by pushing the one part of the access pipe, thereby creating the opening.

8. The access device according to claim 1, further comprising an insulator disposed at a distal end of the access pipe,
wherein, in the first configuration, the piecer contacts the insulator, and
wherein, in the second configuration, the piercer is spaced apart from the insulator.

9. The access device according to claim 1, further comprising an insulator disposed at a distal end of the access pipe,
wherein the insulator includes a first insulator portion and a second insulation portion,
wherein the piercer includes a first piercer portion and a second piercer portion,
wherein the access pipe is divided into a first part and a second part, which are slidable relative to each other,
wherein the first part of the access pipe includes the first insulator portion disposed between the first piercer section and a portion of the first part of the access pipe,
wherein the second part of the access pipe includes the second insulator portion disposed between the second piercer section and a portion of the second part of the access pipe
wherein, in the first configuration, the first piercer section contacts the second piercer section, and
wherein, in the second configuration, the first piercer section is spaced apart from the second piercer section.

10. An access device used with an endoscope, comprising:
an access pipe configured to be inserted into a sheath of the endoscope;
a piercer disposed on a distal end portion of the access pipe; and
a treatment tool configured to be inserted into the access pipe,
wherein the piercer includes an energy device configured to apply energy and a stylet that is disposed inside the access pipe and electrically connected to the piercer,
wherein the access device is switchable between a first configuration and a second configuration,
wherein, in the first configuration, the stylet is configured to activate the energy device to pierce the piercer into a hollow organ of a patient,
wherein, in the second configuration, the stylet is configured to deactivate the energy device, and is configured to advance the piercer away from the access pipe to create an opening between the piercer and the access pipe of sufficient dimension to introduce the treatment tool into the hollow organ via the opening, and
wherein, in the first configuration, the opening between the piercer and the access pipe is closed.

11. The access device according to claim 10, wherein the opening is partitioned into a first opening portion and a second opening portion by the stylet, and
wherein at least one of the first opening portion and the second opening portion is configured for inserting the treatment tool.

12. The access device according claim 10, wherein the access pipe is divided into a first part and a second part, which are slidable relative to each other to create the opening.

13. The access device according to claim 12, wherein the piercer includes a first section and a second section, and
wherein the one of the first section and the second section of the piercer and the stylet are operatively configured to be advanced away from the other of the first section and the second section of the piercer by pushing the one part of the access pipe, thereby creating the opening.

14. The access device according to claim 13, further comprising a first insulator disposed between the first section of the piercer and the first part of the access pipe, and a second insulator disposed between the second section of the piercer and the second part of the access pipe,
wherein the first insulator includes a first inclined surface extending from the first part of the access pipe toward a center of the access pipe, and the second insulator includes a second inclined surface extending from the second part of the access pipe toward the center of the access pipe, and
wherein at least one of the first inclined surface and the second inclined surface is configured to guide the treatment tool into the hollow organ.

* * * * *